Patented Feb. 24, 1942

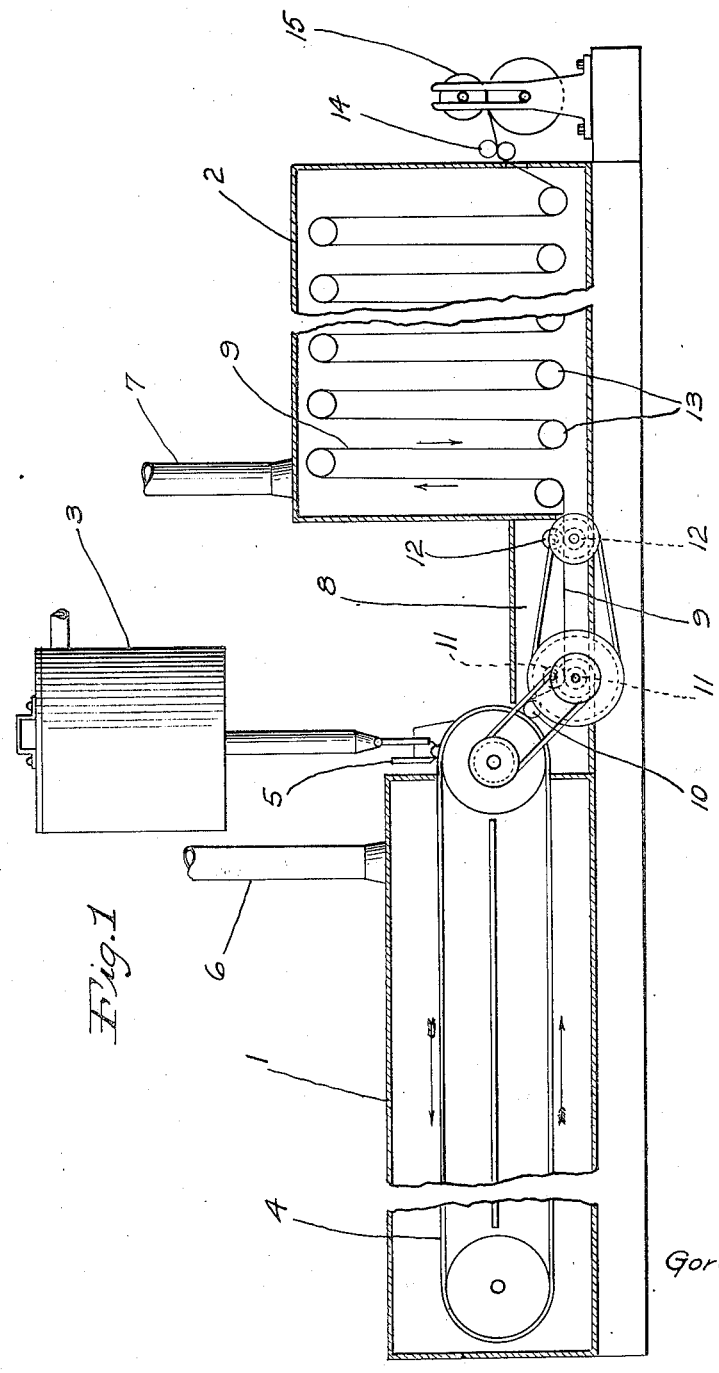

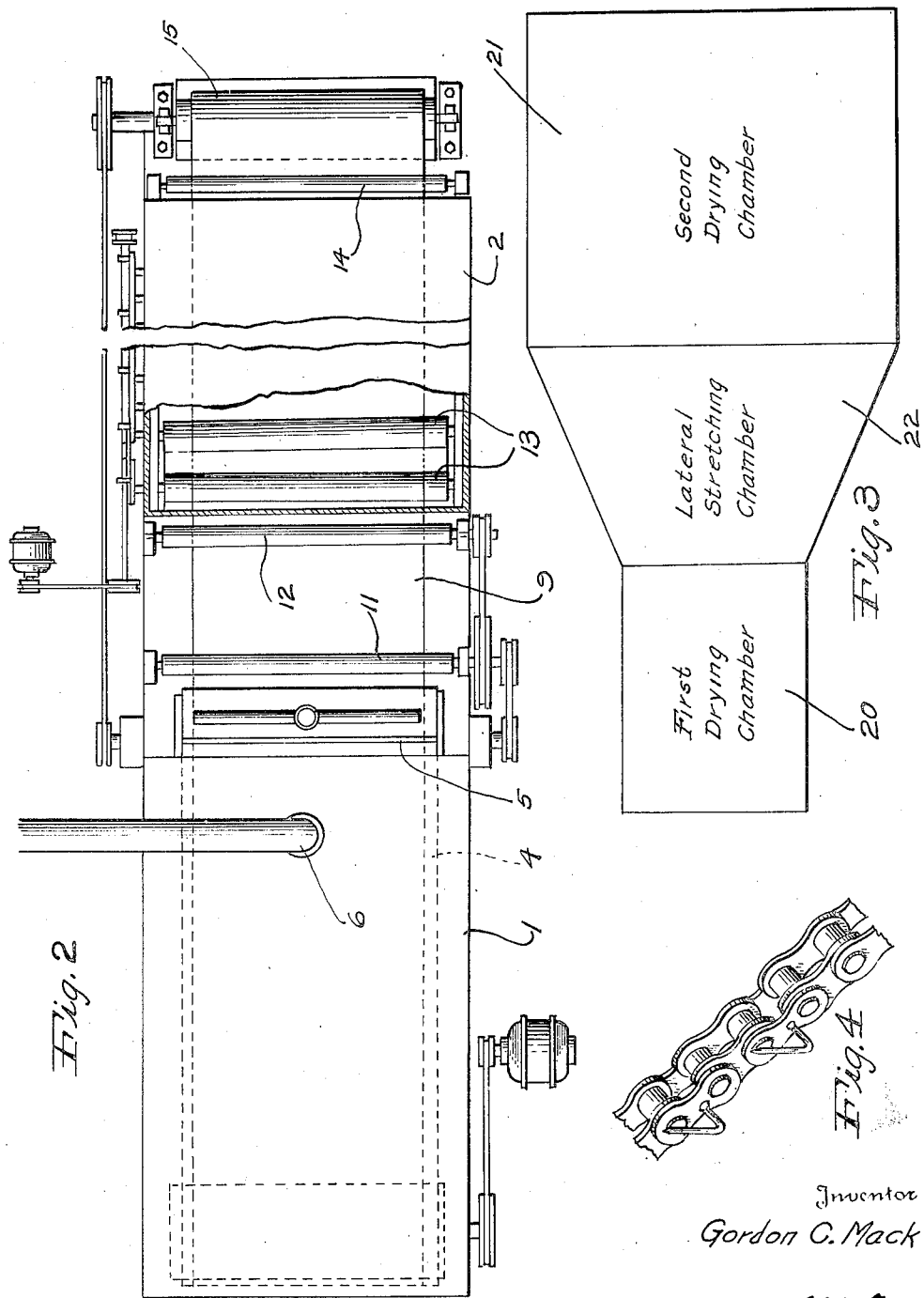

2,274,150

UNITED STATES PATENT OFFICE 2,274,150

MANUFACTURE OF RUBBER HYDRO-
CHLORIDE FILMS

Gordon C. Mack, Akron, Ohio, assignor to Wing-
foot Corporation, Wilmington, Del., a corpora-
tion of Delaware Application September 9, 1937, Serial No. 163,085

4 Claims. (Cl. 18—57)

This invention relates to the manufacture of rubber hydrochloride film. More particularly it relates to the production of a stretched film by a process in which the film is stretched while it contains solvent, that is, between the time of casting the rubber hydrochloride cement in film form and the final step of removing solvent. Although the invention will be described more particularly in connection with the manufacture of rubber hydrochloride film it includes the manufacture of film of other rubber hydrohalides such as rubber hydrobromide.

The manufacture of rubber hydrochloride film by casting the rubber hydrochloride cement is limited to the production of film of about .001 of an inch thick. Films half as thick or twice as thick may be made. However, it has been impossible to make very thin films by this casting process. There is a demand for such thin films. It has been suggested that they be made by stretching the thicker films but it has not heretofore been realized that films of any desired thickness can be made by the casting process if the film is stretched while it contains solvent.

According to this invention the film of a rubber hydrochloride cement produced by casting the cement is passed through a heated chamber where a part of the solvent is evaporated so as to produce a film which can be removed from the casting surface without distortion. This film which retains a portion of the solvent is then stretched. It may be stretched longitudinally 100% or 200 or 300% or even as much as 400 or 500% or more. It may be stretched laterally as much as 25 or 50% or more. It may be stretched laterally and longitudinally simultaneously or successively. The balance of the solvent is then removed. The resulting film differs from ordinary cast film not only in its thickness but in its strength, tear resistance, etc.

The cement from which the film is cast may be a benzene cement or a chloroform cement or a cement of the rubber hydrohalide in any suitable solvent. The cement may be cast on a drum or a belt. A metal drum or belt may be used but a belt with a suitable cellulosic coating is preferred. The invention will be further described in connection with the accompanying drawings in which Figs. 1 and 2 indicate an elevation and plan view of apparatus designed for longitudinal stretching. Fig. 3 indicates diagrammatically a plan view of apparatus adapted for lateral stretching. Fig. 4 is a detail. The drawings indicate the apparatus more or less diagrammatically. For a more detailed explanation of suitable apparatus attention is called to Calvert 2,078,526. In the drawings the first drying chamber is indicated by the numeral 1 and the second drying chamber by the numeral 2.

The rubber hydrochloride cement is applied from a storage tank 3 onto the belt 4 where it is spread by the knife 5. The vapor outlet pipes 6 and 7 lead to solvent recovery apparatus and any suitable means for the introduction and heating of air or gas used for the drying may be employed.

The solvent content of the cement spread on the belt 4 is reduced during the passage of the film through the chamber 1 so that when it is removed from the belt in the stretching chamber 8 it is self-supporting film, 9. The solvent content may be around 10 to 20%. The film passes over the stripping roll 10 and then through two pairs of driven rollers 11 and 12. The speed of the rollers 11 is such as to handle the film at the same rate that the belt 4 is traveling. The rollers 12 operate at a rate at least two times that of the rollers 11. The film is thus stretched in passing from the rollers 11 to the rollers 12. From the rollers 12 the film 9 passes into the second drying chamber 2 where it is festooned over the rollers 13 and exposed to further drying. The temperature of the air or gas introduced into the second drying chamber 2 may be considerably greater than that used in the drying chamber 1 and the solvent is thus rapidly removed from the stretched film. As the film leaves the second drying chamber it is advantageously passed through another pair of driven rollers 14 which are operated at the same speed as the rollers 12 or a somewhat slower speed to allow for the reduction in the length of the film which takes place on removal of the balance of the solvent. From the rolls 14 the film passes to any suitable wind up device indicated at 15.

Instead of stretching the film by passing it through rollers driven at different speeds the stretching may be accomplished by imposing a weight on the film or by any other suitable means.

Fig. 3 is an outline of apparatus designed for lateral stretching. The first drying chamber 20 contains the belt with means for supplying rubber hydrochloride cement and for solvent removal, etc. The second drying chamber 21 may be equipped with festooning means as illustrated in Fig. 2. In the stretching chamber 22 a tenter is employed for lateral stretching. Many suitable tentering devices are on the market. Any means for grasping the film at the edges and stretching it or for tensioning the film laterally may be employed.

If the tenter leaves marks on the film these may readily be trimmed from the film preferably after drying and before or simultaneously with the rolling up of the finished film after it has passed through the second drier. The stretched film may advantageously be passed through the second drier supported and tensioned by a chain equipped with spikes as shown in Fig. 4. The chain passes on each side of the film and the spikes are pressed through the film as it enters the drying chamber. This holds the film taut as it is dried and prevents retraction or shrinking. The edges of the film through which the spikes have passed may be trimmed after drying.

If it is desired to stretch the film both laterally and longitudinally the two means for stretching may be used successively. For example, the film may first be stretched longitudinally and then laterally or it may be stretched laterally and then longitudinally. By means of a suitable tentering device the film may be stretched longitudinally and laterally simultaneously.

The apparatus shown in Calvert 2,078,526 provides for a transfer of the drying gases from the second drying chamber to the first drying chamber through a special duct which has been replaced in the present device by the stretching equipment. The gases from the second chamber may similarly pass through the stretching compartment to be used in the first chamber so that the film is dried somewhat during the stretching operation. On the other hand the gases may be by-passed around this chamber so that there is only a slit opening from the stretching chamber into each of the drying chambers or the gases used for drying in the two drying chambers may be handled separately without any intermingling.

The cement from which the film is cast may be colored with dyes or pigments. It may contain plasticizers, for example butyl stearate and dibutyl phthalate. It may contain photochemical inhibitors, for example hexamethylene tetramine and the other inhibitors mentioned in Calvert 1,989,632.

I claim:

1. The method of producing rubber hydrochloride film which comprises casting rubber hydrochloride cement on a continuous surface, evaporating a part of the solvent from the cement while on said surface and thereby removing sufficient solvent to obtain a self-supporting film, removing the film from said surface, stretching the film to increase its area at least one hundred per cent and then removing the balance of the solvent.

2. The method of producing rubber hydrochloride film which comprises casting rubber hydrochloride cement on a continuous surface, evaporating a part of the solvent from the cement while on said surface and thereby removing sufficient solvent to obtain a self-supporting film, removing the film from said surface, stretching longitudinally to increase its length at least 100 per cent and then removing the balance of the solvent.

3. The method of producing rubber hydrochloride film which comprises casting rubber hydrochloride cement on a continuous surface, evaporating a part of the solvent from the cement while on said surface and thereby removing sufficient solvent to obtain a self-supporting film, removing the film from said surface, stretching laterally and longitudinally to increase the area of the film at least one hundred per cent and then removing the balance of the solvent.

4. In the method of producing rubber hydrochloride film the steps which comprise casting a cement of a rubber hydrochloride on a continuous surface, evaporating only a part of the solvent from the film while supported on said surface but removing sufficient solvent to produce a self-supporting film, removing the film from the surface and stretching it to increase its area at least one hundred per cent while it still retains an appreciable amount of solvent.

GORDON C. MACK.